May 22, 1962  L. GOLDENBERG ETAL  3,036,141
MAGNESIUM GALVANIC CELL
Filed July 18, 1958
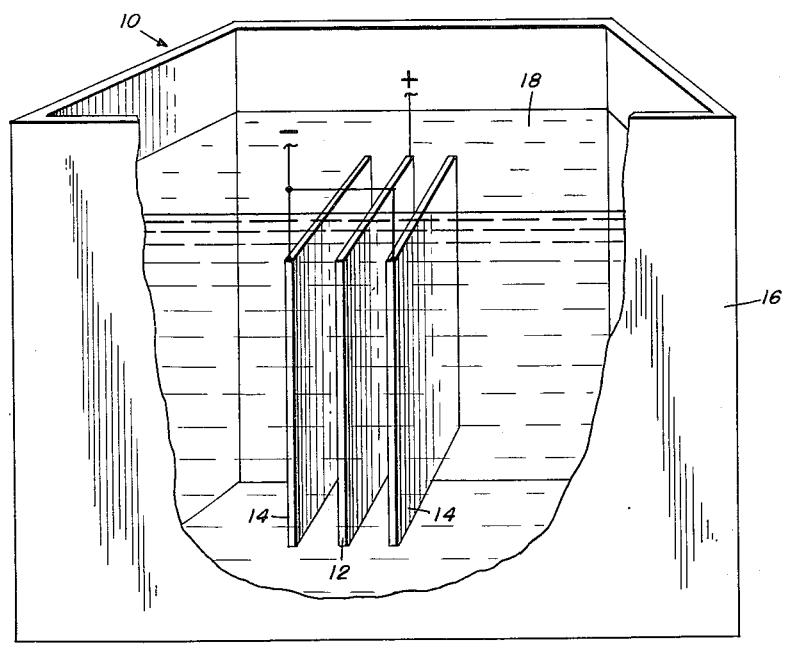

3,036,141
MAGNESIUM GALVANIC CELL
Leo Goldenberg, 900 Malta Lane, Silver Spring, Md., and Morris Fidelman, Adelphi, Md. (1217 De Vere Drive, Silver Spring, Md.)
Filed July 18, 1958, Ser. No. 749,363
4 Claims. (Cl. 136—100)

This invention relates to magnesium galvanic cell. More particularly, this invention relates to a cell comprising a magnesium or magnesium alloy anode, an aqueous electrolyte and an inert cathode.

It has long been recognized that metallic magnesium has a sufficiently high electromotive potential to serve as the basis for a primary cell having an attractive ratio of output energy to weight. Magnesium metal can be made to produce electrical power through the following reaction:

$$Mg + 2H_2O \rightarrow Mg(OH)_2 + H_2 + \text{Current}$$

Unfortunately experimenters were never able to attain voltages under closed circuit conditions equalling the potential which theoretically appeared available. As a result, prior art efforts were largely predicated on attempts to de-polarize the electrolyte in order to obtain maximum voltages. Patent 2,706,213 is representative of prior art cells employing oxidizing agents to react away the hydrogen produced in the cell.

However, there is an alternative approach which offers many advantages. This alternative approach consists of recovering or venting the hydrogen product. Desirably, the free hydrogen evolved can be recovered for later reaction with oxygen to water under conditions which produce additional electrical power. Reference is made to the copending Goldenberg-Eidensohn application, S.N. 629,199 for this subject matter.

Unfortunately, the magnesium batteries operated without de-polarization by chemical reagents which have been either dissolved in the electrolyte or incorporated in the cathode structure have proven to be impractical. A recently published report describes a magnesium battery employing a carbon cathode and salt water for the electrolyte, listed relatively poor results. (J. J. Shotwell, R. C. Kirk and Arthur Nelson—"A Magnesium Sea Water Battery"—Abstract No. 18, October 1957 Meeting of Electrochemical Society in Buffalo, New York.) The maximum current density obtainable at complete short circuit approximated 18 amperes per square foot of cathode surface. Similarly, Patent 2,706,213 reports a current of about 7 amperes at one volt over 240 square inches of cathode surface, using a cathode of rustless steel plate. A short circuit current density is indicated therein of below about 10 amperes per square foot. Although the foregoing reports that power can be obtained from the magnesium-water reaction in the absence of depolarizing reagents, they also demonstrate the possibility of drawing but a few amperes per square foot of cathode surface under conditions of maximum power output, i.e., at about 0.35 volt per cell.

The reported information would appear to rule out the possibility of a magnesium battery which does not incorporate reagents for depolarization of hydrogen. Yet, a most important requirement for a magnesium battery is that hydrogen depolarizers be omitted. The expense of providing oxidizing agents like hydrogen peroxide, chromates, etc., sharply increases the cost of the cell. In addition, since these agents tend to corrode or passivate the magnesium anode, other chemicals must be added to avoid these side effects, or complex electrolyte storage and circulation systems must be incorporated into the cell. On an overall basis, the higher voltages obtained by depolarization of the hydrogen do not compensate for the increase in cost and complexity directly attributable to depolarization efforts. Far preferable would be a lower cell voltage at reasonable current density, without depolarization. Unfortunately, reasonable current densities have not been attainable heretofore.

The reported information would appear even to rule out the possibility of metal for the inert cathodes. Yet, an absolute requirement for a commercially saleable magnesium-water cell is that the cathode be capable of fabrication in large sizes at reasonable costs. Desirably, the surface to volume ratio of the cathode material should be extremely high. Carbon being a frangible relatively weak structural material offers a poor base for a cathode surface since comparatively thick sheets are therefore required for structural stability. Only metal can fulfill all the requirements for a good cathode.

The object of the instant invention is to provide a magnesium galvanic cell employing a metal-supported cathode surface.

A further object of the instant invention is to provide a magnesium cell employing a cathode surface having a low hydrogen overvoltage.

Other objects and the advantages of this invention will be apparent from the description which follows.

Briefly stated, cells constructed according to the instant invention have a magnesium anode, an aqueous electrolyte and a metallic cathode support, surfaced with a dull plate of a metal selected from the group consisting of iron, nickel, cobalt and alloys thereof. This cathode surface would ordinarily be plated upon a ferrous basis metal like sheet or strip steel. Other metals available in sheet form like copper can also serve as the basis metal for the plated cathode surface. For the anode, pure magnesium or magnesium alloys may be used, and the term "magnesium" as hereinafter employed is intended to include both pure magnesium and high magnesium content alloys.

It has been determined that iron, nickel and cobalt are by far the best cathode materials of the relatively inexpensive or base metals. However, the proper metal is in itself not sufficient for purposes of a magnesium battery. A metallic cathode face of high surface area is essential; in short, the cathode surface must be a dull or matte plate of the metal. Within the intent of the terms dull, are included such finishes as those known as dull, burnt, dendritic, matte. Bright or burnished plates are unsatisfactory. Thus rolled nickel, even after etching, results in comparatively low short circuit current density. Bright nickel plate is not materially better. However, a matte nickel plate achieved by electroplating at 50 amperes per square foot has exhibited a short circuit current density of 100 amperes per square foot, even though a nondescript magnesium alloy was employed for the anode. A dull nickel electroplate is preferred for surfacing the cathode, but electroless plating techniques are also contemplated for providing the desired surface. Also, the nickel, cobalt or iron may be plated individually or co-deposited with minor percentages of an otherwise uncontemplated metal in the form of an alloy.

The dull cathode surface produced by plating provides numerous other advantages besides the cheapness of a thin coating. A self-supporting metal sheet of several hundred square inches need not be more than 10 mils in thickness. An effective plated cathode surface need not exceed one mil in plate thickness. Thus, the total depth of a 12" x 12" metal supported plated cathode can be roughly 12 mils in thickness and still be shock-resistant and self-supporting. A comparable self-supporting, shock-resistant carbon based cathode could easily exceed 100 or even 500 mils in thickness. Since magnesium primary batteries necessarily will be made from a multiplicity of anodes and cathodes assembled into many cells, the substantial power density per unit of volume possible for cells employing metal cathode supports and plated cathode surfaces directly reflects in higher output energy for any given volume of battery. Furthermore, the high usable current density of the metal-supported cathode more than compensates for the lower cell voltage of the non-depolarized cell.

Extensive tests have demonstrated that plated surfaces of iron, nickel and cobalt are chemically inert and can be employed almost indefinitely as cathodes. These metals are all relatively corrosion-resistant and have a shelf like far exceeding that of the magnesium anodes when the battery is not in use. Moreover, hydrogen evolving at the cathode surface does not appear to deactivate the plated cathode surface. The cathode surface does not appear to be overly sensitive to air oxidation. In particular, repeated use of nickel plated surfaces for the cathode, followed by removal of the cathode from the electrolyte and air drying, did not affect the short circuit current density. In fact, the cathode surface is largely self-regenerating under conditions of use. A cathode surfaced by matte nickel electroplate of one mil exhibited a short circuit current density of 80 amperes per square foot, under a given set of cell conditions. The cathode was then removed from the electrolyte and oxidized by a flame to a deep blue coloration (nickel oxide), then re-assembled as the cathode in the same cell under the identical conditions as before flame oxidation. After a relatively long (20 minutes) current build-up, the cathode reached an apparent equilibrium of 50 amperes per square foot short circuit current density and maintained this current density for the two hour length of the test. Thereafter, the cathode was removed and visually examined. The deep blue color had been bleached to a very pale blue. Furthermore, the blue coloration appeared to have a sub-surface location. This test indicated that evolving hydrogen was able to reduce the blue oxide on the immediate surface, and in effect regenerate to a definite extent the desirable nickel cathode surface. Since immediate subsurface portions of the plate appeared incompletely reduced, this specific experiment indicates the higher effective surface area provided by a dull plate as compared to its apparent surface area; and that deactivation of the deeper part of the effective surface area, by intrusive oxidation, materially reduced the capacity of the cell.

As has been indicated, the cathode surface should consist essentially of iron, cobalt, or nickel. Generally speaking, these metals have the distinct advantage over other platable metals like copper, zinc, tin, etc., of having a lower hydrogen overvoltage. Other metals having low hydrogen overvoltage (notably precious metals like platinum) have been expressly excluded because of their extreme ratio of price difference compared to nickel (about 1000 to 1) and their relative unavailability. Even though only a small amount of plating metal is required in a plated cathode surface, and the material cost of nickel, cobalt or iron is negligible per plated square foot, the same does not follow when plating precious metals. The price ratio is so extreme that material cost alone becomes prohibitive. Moreover, for the large scale use to which this cell is particularly adapted, the relative scarcity of precious metals like platinum, may preclude their employment at any price.

A further feature of the instant invention lies in the criticality of electrode spacing. Ordinarily it is desirable to minimize the distance between electrodes in order to maximize total capacity. However, in batteries constructed according to the instant invention, proper spacing appears critical. The reason lies in the nature of the magnesium cell itself. The end products resulting from the overall reaction of magnesium and water are hydrogen and magnesium hydroxide. Hydrogen, being gaseous, passes upwardly through the electrolyte liquid and escapes from the surface. Magnesium hydroxide forms an insoluble "floc" in the electrolyte. Peculiarly enough, the presence of flocculent magnesium hydroxide does not affect operation of the battery. However, something does, because increasing electrode spacing decreases the short circuit current density more than can be expected from the resulting increase in internal cell resistance. Apparently, the turbulence attributable to evolution of hydrogen at both electrodes, and upward passage of this hydrogen through the electrolyte creates an equilibrium (possibly a polarization equilibrium) whose value depends upon the spacing between electrodes, and which affects the short circuit current density. Depending on the geometry of the cell, there is a break point in spacing distance beyond which the short circuit current density drops almost in half. In particular, it has been found that the initial electrode spacing should be within the range of 0.1 to 20 mm. for usable current densities. If desired, an actual optimum spacing within this range can be determined for any ultimate employment by tests on a sample full-size cell operated at design current density. A two-inch long by one-inch wide pair of electrodes measured at different electrode spaces exhibited a decrease of short circuit current density from 100 amperes per square foot at about 1 mm. to 25 amperes per square foot at about 12 mm. The decline was not a linear relation of the spacing. The sharpest decline occurred at varying distances depending in part on the degree to which the magnesium had been corroded by prior use, but generally occurring in the 4–8 mm. spacing range. This current density decline is more than would be expected from the resistance of the electrolyte alone.

On an overall basis, a usable current density is developed for any pair of electrodes spaced apart within the aforesaid range of 0.1 to 20 mm. Within this range some optimum distance will exist for each particular cell. While employment of optimum spacing is generally contemplated as the customary practice of this invention, it should be understood that other considerations may necessitate employement of a non-optimum spacing in particular cells, and that the entire spacing range of 0.1 to 20 mm. is contemplated within the scope of the instant invention.

The accompanying drawing illustrates diagrammatically a preferred mode of constructing such an individual cell. The cell 10 is comprised of a magnesium anode sheet 14 and a cathode-surfaced sheet 12. To illustrate the use of both surfaces, a second magnesium anode sheet 14 is positioned on the other side of cathode 12. The cell is suitably housed in a container 16 along with aqueous electrolyte 18. A multiplicity of cells 10 would be employed to make up a battery.

It should be noted that no limitations have been ascribed to the composition of the aqueous electrolyte. Within the context of the instant invention, it is only necessary that the electrolyte be aqueous in order to provide the water necessary for the chemical reaction. Any electrically conductive aqueous solution may be employed in the cell, although it should be appreciated that inexpensive electrolytes like sea water or brine would be employed most commonly. It is, however, appreciated that not all electrically conductive aqueous solutions are alike, and the instant invention expressly contemplates possible employment of electrolytes specifically devised for the instant cell. Moreover, the electrolyte may contain depolarizers, even though a prime object of this invention was to devise a cell which does not require depolarization. In sum and substance, the improved results attributable to the instant invention are not considered to be dependent on any particular electrolyte.

The following specific examples are presented for a clearer understanding of the invention.

EXAMPLE I

A series of nickel plate specimens were prepared by electroplating 1 mil of nickel on steel sheet metal at current densities of 5 (bright), 25, 50, 100 amps. per square foot. Specimens 2 inches long by 1 inch wide were assembled with 2″ x 1″ magnesium specimens into cells at various spacings of 1/16, 1/8, 1/4, 1/2 inch, and submerged into 3% salt water and in saturated brine. The short circuit currents in amperes per square foot are tabulated below.

Table I

| | Short Circuit Current Density | | |
|---|---|---|---|
| | A | B | C |
| Conditions | For Bright Plate | For 25 Amp./Ft.² Plating Current Density | For 100 Amp./Ft.² Plating Current Density |
| (1) 3% Salt 1/8″ | 19 | 70 | 65 |
| (2) Sat. Brine 1/16″ | 35 | 100 | 92 |
| (3) Sat. Brine 1/8″ | 23 | 82 | 75 |
| (4) Sat. Brine 1/4″ | 17 | 62 | 57 |
| (5) Sat. Brine 1/2″ | 12 | 43 | 39 |
| (6a) Before flame oxidation 1/8″ | | 80 | |
| (6b) After flame oxidation 1/8″ | | 50 | |

Test 2B was run until the magnesium anodes were almost completely consumed (about 3 hours). The actual current output at short circuit dropped gradually from 1.30 amp. at the beginning to 0.68 amp. at the end of the test. The magnesium surface was evenly corroded over the entire surface with a slightly increased metal loss at the sides and bottom edges of the magnesium strip. The rear surface of the magnesium was largely unaffected. These currents, computed to a square-foot basis, range from 100 to 52 amps. per square foot.

EXAMPLE II

A parallel and confirmatory series was run under a fixed voltage output to determine the current density per square foot at a delivered 0.5 volt with 1/8″ spacing.

Table II

| | Cell Current Density at 0.5 volt Output | | |
|---|---|---|---|
| Electrolyte | Cathode Bright Nickel | Cathode Plated at 25 Amps./Ft.² | Cathode Plated at 100 Amps./Ft.² |
| 3% Salt | 12 | 25 | 23 |
| Sat. Brine | 14 | 30 | 27 |

In order to compare the effect of repeated immersion and drying, some of the foregoing tests were made with the same cathode. No difference was observed between used cathodes and fresh cathodes.

What is claimed is:

1. A galvanic cell comprising a metallic magnesium anode, an aqueous electrolyte and a metallic cathode having an electroplated surface, said cathode surface consisting of a dull electroplate of a metal selected from the group consisting of nickel, cobalt, iron and alloys thereof containing not more than minor percentages of other metals, the initial spacing between anode and cathode being in the range of 0.1 mm. to 20 mm.

2. In a galvanic cell comprising an aqueous electrolyte, an inert cathode and a metallic magnesium anode, the improvement comprising spacing a metallic cathode surface a distance within the range of 0.1 to 20 mm. from the magnesium anode, and employing as said cathode surface a dull electroplate of a metal selected from the group consisting of nickel, iron, cobalt and alloys thereof containing not more than minor percentages of other metals.

3. A galvanic cell according to claim 1, wherein the cathode is nickel-plated sheet metal.

4. A galvanic cell according to claim 1, wherein the anode is sheet magnesium and the cathode is nickel electroplated on sheet metal.

References Cited in the file of this patent

UNITED STATES PATENTS

| 1,427,171 | Smith | Aug. 29, 1922 |
| 2,655,551 | Ellis | Oct. 13, 1953 |
| 2,677,006 | Ameln | Apr. 27, 1954 |
| 2,706,213 | Lucas | Apr. 12, 1955 |

FOREIGN PATENTS

| 401,717 | Great Britain | Nov. 20, 1933 |
| 402,752 | Great Britain | Nov. 28, 1933 |

OTHER REFERENCES

Robinson: Transactions of the Electrochemical Soc., vol. 90 (1946), pages 485–499.